Aug. 6, 1968 H. KOCHALSKI 3,395,570
METHOD AND APPARATUS FOR TESTING CIGARETTES OR THE LIKE
Filed Dec. 20, 1965 5 Sheets-Sheet 5

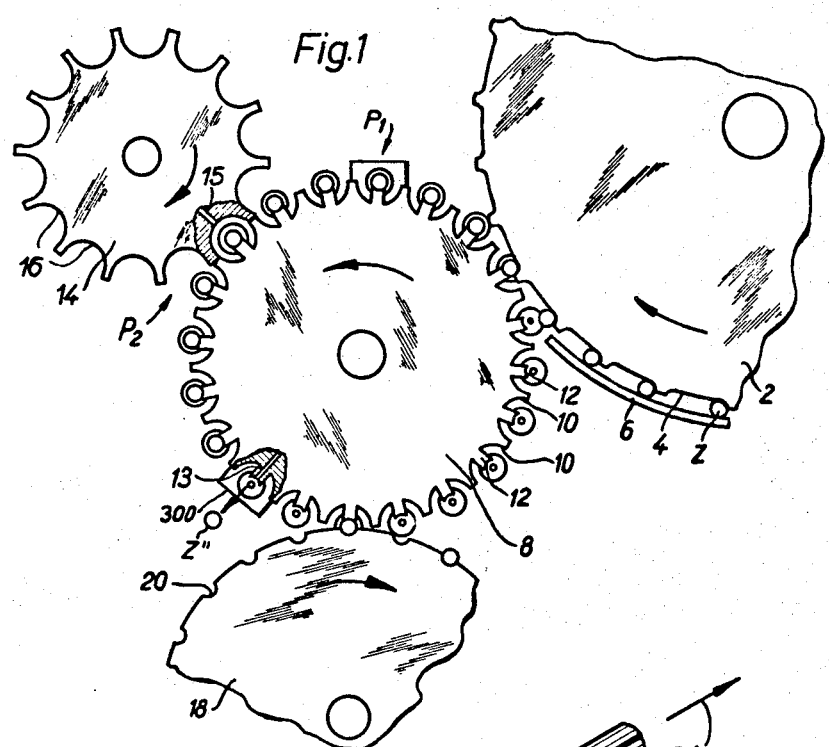
Fig.1
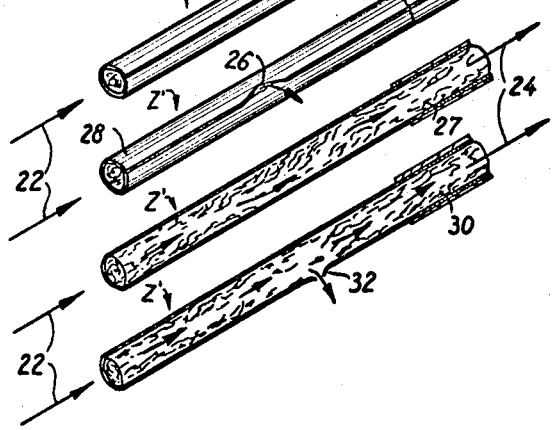
Fig.2
Fig.3
Fig.4
Fig.5
INVENTOR.
Horst Kochalski
BY
Michael J. Striker Aug. 6, 1968
H. KOCHALSKI
3,395,570
METHOD AND APPARATUS FOR TESTING CIGARETTES OR THE LIKE
Filed Dec. 20, 1965
5 Sheets-Sheet 2
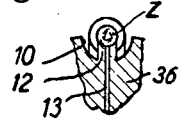
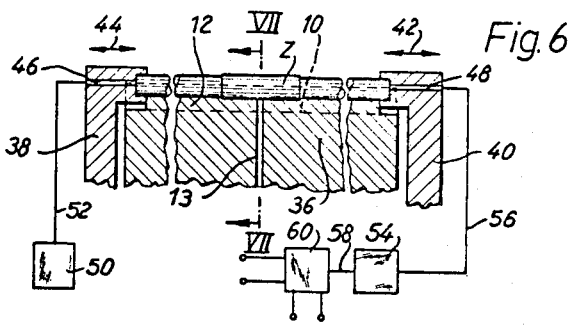
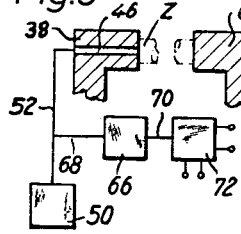
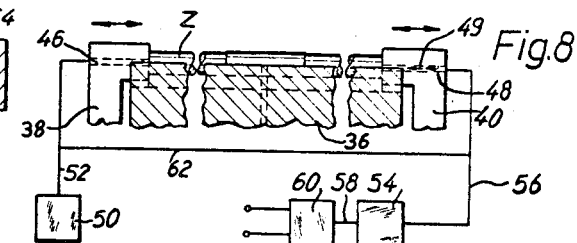
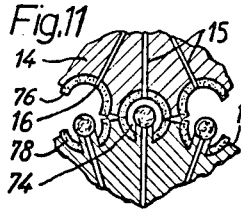
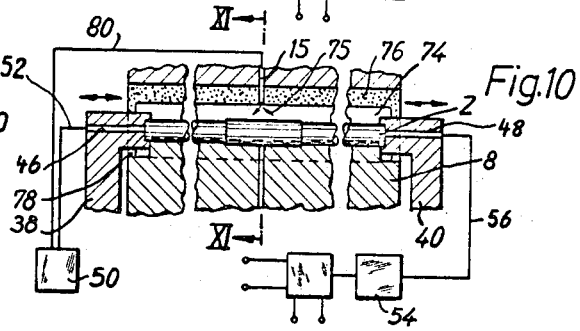
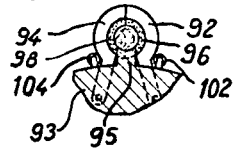
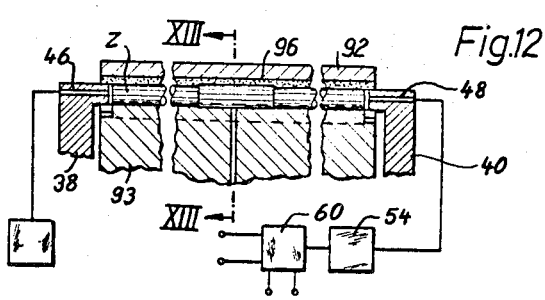
INVENTOR.
Horst Kochalski
BY Michael S. Striker

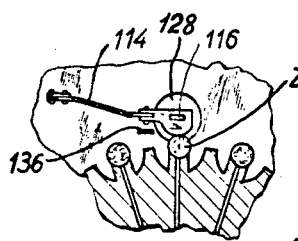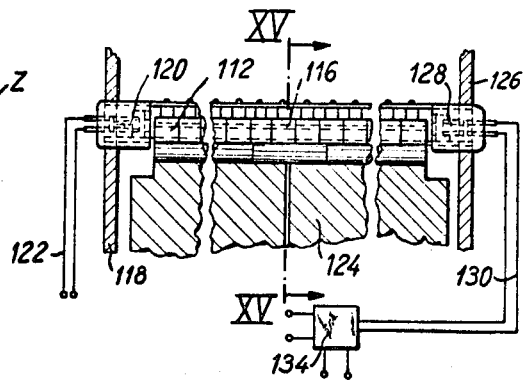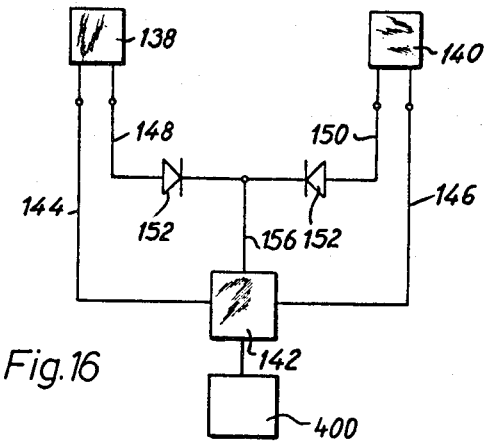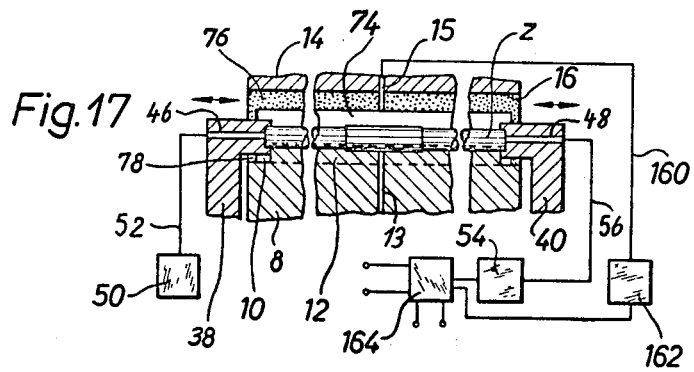

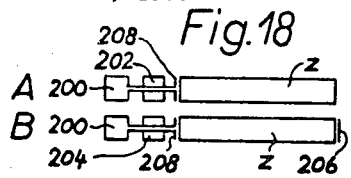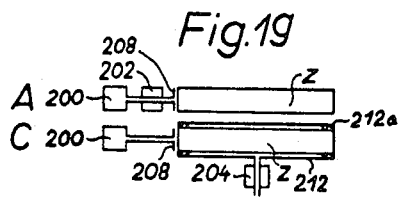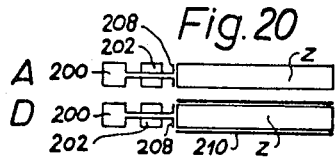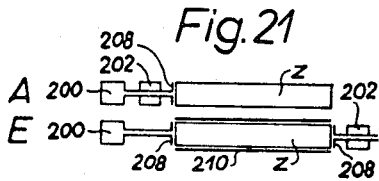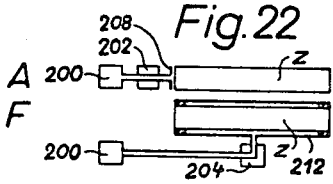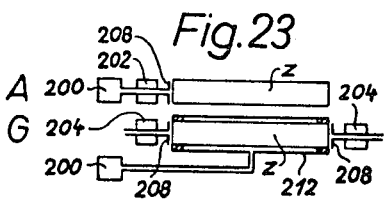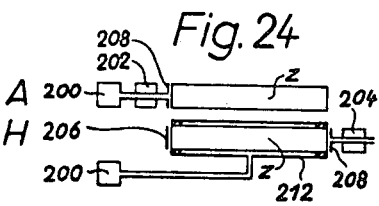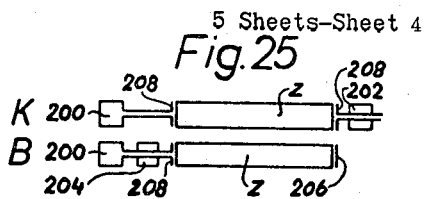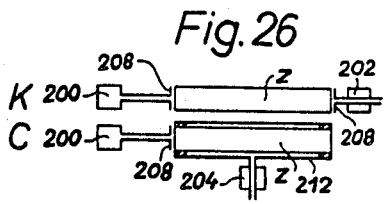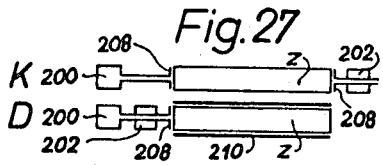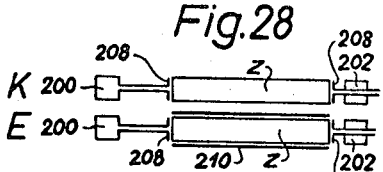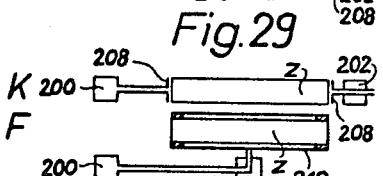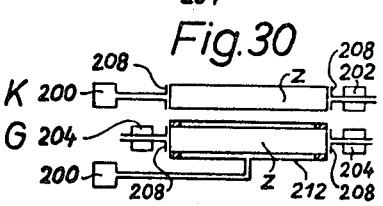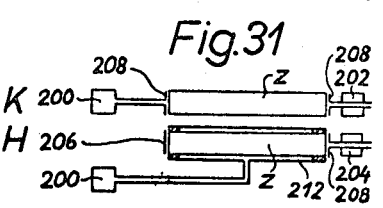

INVENTOR.
Horst Kochalski
BY
Michael J. Striker

United States Patent Office 3,395,570
Patented Aug. 6, 1968

3,395,570
METHOD AND APPARATUS FOR TESTING CIGARETTES OR THE LIKE
Horst Kochalski, Hamburg-Lohbrugge, Germany, assignor to Hauni-Werke Koerber and Co. K.G., Hamburg-Bergedorf, Germany
Filed Dec. 20, 1965, Ser. No. 514,931
Claims priority, application Germany, Dec. 18, 1964, H 54,629
18 Claims. (Cl. 73—45.2)

ABSTRACT OF THE DISCLOSURE

Cigarettes are tested for the integrity of their wrappers and fillers in two successive stages and in such a way that defects of the filler cannot interfere with detection of defects in the wrapper or vice versa. Signals produced in response to detection of defective fillers and/or wrappers are employed to eject the corresponding cigarettes.

---

The present invention relates to a method and apparatus for testing cigarettes, cigars, cigarillos and/or cheroots with or without filters, and other types of rod-shaped articles wherein a filler rod consisting of shredded or otherwise comminuted tobacco leaves or tobacco foil and/or filter material is surrounded by a tubular wrapper. More particularly, the invention relates to a method and apparatus for testing cigarettes or similar rod-shaped articles for integrity of each of their components, namely, the filler and the wrapper.

It is already known to test cigarettes by streams of air which is conveyed axially through the filler. If the wrapper has a leak, the pressure of the air stream which issues from the filler is different from the pressure of an air stream which has passed through a cigarette whose wrapper is intact so that, by comparing such optimum pressure with the actual pressure, one can determine the condition of wrappers. However, in certain instances the comparison will indicate the presence or absence of leaks only if the density of the filler is satisfactory because, and assuming that the wrapper of a cigarette whose filler is too dense has developed a leak, the overly dense filler may affect the air stream in such a way that the presence of the leak remains undetected. In other words, one type of defects or flaws may affect the test in such a way that another type of flaws remains undetected. Therefore, testing by streams of air need not invariably result in detection of all flaws and, consequently, cigarettes with two or more different flaws might remain undetected so that they will be free to advance to the storing, packing or another processing station and will ultimately reach the consumer. On the other hand, it is highly desirable to remove and to destroy cigarettes with multiple defects or flaws because such multiple defects are even more likely to irritate a smoker. Multiple defects develop frequently when the tobacco filler rod is too loose because, during wrapping, the soft filler rod cannot offer sufficient resistance to the pressure which is applied while the overlapping edges of the wrapper are being bonded to each other. If a cigarette whose wrapper is leaky and whose filler is too loose is thereupon tested with a stream of compressed air, some air will escape through the leak and it can happen that the pressure of the remaining air which passes through the unsatisfactory filler is such that the testing apparatus fails to detect the dual defect.

Accordingly, it is an important object of the present invention to provide a novel method of testing cigarettes and similar rod-shaped articles in such a way that the presence of a flaw in the wrapper and/or in the filler will be detected without fail, even in the event that the tested article has two or more flaws one of which is likely to interfere with the testing operation for detection of the other flaws or flaws.

Another object of the invention is to provide a method of the just outlined characteristics which may be resorted to in testing of all such rod-shaped articles wherein a tubular wrapper surrounds a filler of tobacco and/or filter material, and according to which the presence or absence of leaks in the wrapper may be detected independently of the presence of absence of defects in the density of the filler, or vice versa.

A further object of the invention is to provide a method of testing cigarettes or the like according to which a plurality of testing operations may be carried out in a simultaneous step.

An additional object of the invention is to provide a method according to which cigarettes or similar rod-shaped articles may be tested while in motion so that the testing operation does not cause any delays in delivery of such articles to the next processing station.

A further object of my invention is to provide a method of the above outlined characteristics according to which the articles may be tested in rapid sequence, with a desired degree or accuracy, and in such a way that even small leaks and/or small deviations from optimum density may be detected and the respective articles removed, ejected or destroyed before they can reach the consumer and preferably before they can undergo any further treatment which is intended solely for satisfactory articles.

A concomitant object of the invention is to provide a novel apparatus for testing cigarettes or similar rod-shaped articles and to construct and assemble the apparatus in such a way that it occupies little room, that its operation is fully automatic, that it can automatically segregate defective articles from satisfactory articles, and that it can treat the articles gently without causing excessive deformation of or damage to the wrappers and/or loss of filler material at the ends of such wrappers.

Still another object of my invention is to provide a testing apparatus which can be readily installed in or combined with presently known cigarette machines, cigar machines, filter machines and other types of machines wherein fillers of tobacco and/or filter material are wrapped into cigarette paper, tobacco foil, tobacco leaves or other suitable wrapping material.

Another object of the instant invention is to provide a testing apparatus which may be assembled of simple and compact units, which can be adjusted to detect more or less pronounced flaws in the components of wrapped rod-shaped articles, and which can test the articles mechanically, by means of suction air and/or by means of compressed air.

A further object of the invention is to provide a testing apparatus wherein the presence or absence of one type of defects cannot compensate for the presence or absence of another defect so that the apparatus will invariably detect not only such articles which exhibit a single defect but also all such articles which are defective in more than a single respect.

Briefly stated, one feature of my present invention resides in the provision of a method of testing cigarettes and similar rod-shaped articles of the type wherein a first component in the form of an open-ended tubular wrapper surrounds a second component in the form of an air-permeable filler and wherein defects of one component (such as leaks in the wrapper or excessive or less than satisfactory density of the filler) tend to interfere with detection of defects of the other component or vice versa. In its simplest form, the method of my invention contemplates dual testing of each article, preferably by subjecting at least one of the components to a first testing action which, in response to the presence of a defect, produces a first result (e.g., an electrical or other signal), by subjecting at least the other component to a second testing action which, in response to the presence of a defect, produces a second result unaffected by eventual defectiveness of the one component, and disposing of the article when at least one of the two testing actions results in detection of an unsatisfactory component.

Each testing action may comprise the step of testing the respective component or components by air; however, it is equally within the scope of my invention to test one of the components by mechanical means, by beta rays, or in another suitable way.

For example, the first testing action may comprise the steps of conveying an air stream axially through the filler and comparing the pressure of the air stream with a pressure which is indicative of an article with satisfactory components. The other testing action may comprise conveying an air stream radially of the wrapper and comparing the pressure of this air stream with a pressure which is indicative of a satisfactory wrapper.

Alternatively, the first testing action may comprise the steps of sealing the wrapper against penetration of air therethrough, conveying an air stream axially through the filler and comparing the pressure of the air stream with a pressure which is indicative of a satisfactory filler. In this embodiment of my method, the other testing action may comprise the steps of conveying an air stream axially through the filler and comparing the pressure of the air stream with a pressure which is indicative of an article with satisfactory components.

Still further, one of the testing actions may comprise the step of testing only the wrapper, and the other testing action may comprise the step of testing only the filler.

Also, the first testing action may comprise subjecting the exterior of the wrapper to the pressure of a body of air, conveying through the filler an air stream whose pressure, prior to entry into the filler, equals the pressure of the body of air around the wrapper, and comparing the pressure of the air stream which issues from the filler with a pressure which is indicative of a satisfactory filler. In this embodiment, the other testing action may comprise conveying the air stream through the filler and comparing the pressure of the air stream with a pressure which is indicative of an article with satisfactory components.

Still further, one of the testing actions may comprise the steps of conveying an air stream axially through the filler and comparing the pressure of the air stream prior to entry into the filler with a pressure which is indicative of an article with satisfactory components. The other testing action then comprises conveying an air stream through the filler and comparing the pressure of the air stream which issues from the filler with a pressure which is indicative of an article with satisfactory components.

The above are but a few examples of testing actions which may be carried out in practicing the improved method.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawings, in which:

FIG. 1 is a fragmentary front elevational view of a first testing apparatus which comprises two testing units operative at separate testing stations and arranged to test the wrappers and fillers of filter cigarettes of double unit length;

FIG. 2 is a perspective view of a satisfactory filter cigarette;

FIG. 3 is a perspective view of a filter cigarette whose wrapper has a leak;

FIG. 4 is a perspective sectional view of a filter cigarette whose filler is too loose;

FIG. 5 is a perspective sectional view of a filter cigarette wherein a leaky wrapper surrounds a defective filler;

FIG. 6 is a fragmentary axial sectional view of a testing conveyor and of a testing unit which may be utilized in the apparatus of my invention;

FIG. 7 is a transverse section as seen in the direction of arrows from the line VII—VII of FIG. 6;

FIG. 8 is a fragmentary axial section through a testing conveyor which cooperates with a different testing unit;

FIG. 9 is a diagrammatic partly sectional view of a further testing unit;

FIG. 10 is a fragmentary axial section through a testing conveyor which forms part of a testing apparatus wherein one of the testing units can define a sealed chamber for the tested article;

FIG. 11 is a transverse section as seen in the direction of arrows from the line XI—XI of FIG. 10;

FIG. 12 is a fragmentary axial section through a testing apparatus which is similar to the apparatus of FIG. 10;

FIG. 13 is a transverse section as seen in the direction of arrows from the line XIII—XIII of FIG. 12;

FIG. 14 is a fragmentary axial section through a testing conveyor which cooperates with a mechanical testing unit;

FIG. 15 is a transverse section as seen in the direction of arrows from the line XV—XV of FIG. 14;

FIG. 16 illustrates the electric circuit of a further testing apparatus;

FIG. 17 is a fragmentary axial section through a testing apparatus which is similar to the apparatus of FIG. 11; and FIGS. 18 through 44 are diagrams showing various combinations of testing units in accordance with my present invention.

Figure 32:
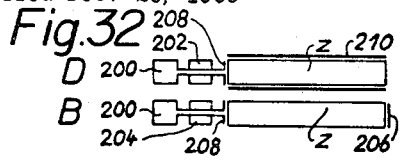

Referring first to FIG. 1, there is shown a portion of a filter cigarette machine or filter cigar machine which includes a wrapping conveyor or drum 2 having axially parallel peripheral grooves 4 wherein tobacco rods are joined with filter plugs by means of adhesive-coated wrappers or patches to form filter cigarettes or filter cigars. Each filter plug may be of unit length and is then joined with a single tobacco rod of unit length. Alternatively, each filter plug may be of double unit length and is then joined with two tobacco rods of unit length to form therewith a filter cigarette or filter cigar of double unit length which is thereupon severed across the filter plug to yield two filter cigarettes or filter cigars of unit length. The drum 2 carries or cooperates with suitable wrapping elements which convolute the patches around the filter plugs and around the adjoining ends of tobacco rods. In the illustrated embodiment, the tobacco rods are assumed to constitute cigarette rods of unit length and pairs of such cigarette rods are assumed to have been connected with filter plugs of double unit length to form therewith filter cigarettes Z of double unit length. Upon completion of the wrapping operation, the filter cigarettes Z travel in their respective grooves 4 along the concave side of an arcuate retaining shield 6 and toward a transfer station where they are transferred onto a testing conveyor or drum 8. The testing drum 8 is provided with axially parallel peripheral pockets 10 each of which accommodates a tooth-shaped elongated holder 12. Each holder 12 is provided with a suction duct 13 and, during each revolution of the drum 8, the holders travel seriatim past two testing stations P1, P2 at each of which the cigarettes are tested by suction air or by compressed air. The configuration and distribution of the holders 12 and of the testing unit at the station P1 may be the same as or analogous to that disclosed in the copending application Ser. No. 208,189 of Kaeding et al. which is assigned to the same assignee.

The testing apparatus which includes the testing drum 10 further comprises a substantially star-shaped rotary sealing drum 14 which is provided with axially parallel pockets 16. The pockets 16 of the sealing drum 14 are similar to the pockets 10 of the testing drum 8 and each thereof cooperates with one of the pockets 10 to form therewith a sealing chamber while advancing past the second testing station P2. The bottom zone of each pocket 16 communicates with a duct 15 which can admit or draw a stream of air from the aforementioned chamber. The testing drum 8 advances tested filter cigarettes Z to a second transfer station where satisfactory cigarettes enter consecutive pockets 20 of a transfer drum 18, the latter serving to advance the cigarettes past a cutter and on to a storing station, to a packing machine, or to another destination.

The numeral 300 denotes an ejecting device which ejects defective cigarettes Z" in response to signals received from the testing units which examine the cigarettes at the station P1 and P2. For example, the device 300 may comprise a source of compressed air which sends a jet of air through the duct 13 to eject the cigarette Z" from its holder. Alternatively, the device 300 may comprise means for disconnecting the duct 13 from a suction pump so that the defective cigarette Z" is removed by gravity.

The drums 2, 14 and 18 are driven to rotate in a clockwise direction, as viewed in FIG. 1, and the drum 8 is driven to rotate in a counterclockwise direction. The peripheral speed of each drum is the same. The path of cigarettes Z extends along the periphery of the wrapping drum 2, thereupon along the periphery of the testing drum 8 and past the two testing stations P1, P2, and finally along the periphery of the transfer drum 18, i.e., such cigarettes travel with the grooves 4, thereupon with the holders 12 in the pockets 10 of the testing drum 8, and finally in the pockets 20 of the transfer drum 18. It will be seen that the cigarettes travel sideways during their movement toward, past and beyond the two testing stations. At the first testing station P1, the cigarettes Z may be tested to determine the condition of their fillers and the condition of their wrappers. At the second testing station P2, the cigarettes may be tested to determine the condition of their fillers. Several types of testing units which may be utilized at the stations P1 and P2 are illustrated in FIGS. 6–44.

Though the improved method and apparatus may be resorted to in testing of cigarettes, cigars, cheroots or cigarillos with or without filters, the following description will refer to tested articles as constituting cigarettes or filter cigarettes with the understanding, however, that the same steps and/or the same testing units may be used in testing of all such rod-shaped articles wherein a rod-shaped filler consisting of or containing tobacco and/or filter material is surrounded by a tubular wrapper. When used for testing of cigarettes without filters, the testing apparatus can be installed in or adjacent to a continuous cigarette rod making machine so that it can test each of a single row or two rows of cigarette rod sections of unit length or multiple unit length while such sections travel sideways toward or beyond the outlet end of the cigarette making machine. For example, the testing apparatus may be disposed immediately downstream of the customary cutting device which subdivides a continuous wrapped cigarette rod into sections of unit length or multiple unit length.

In testing of cigarettes with or without filters, the operation must be carried out in such a way that it will initiate ejection, destruction or collection of cigarettes with one or more of the following defects:

As shown in FIG. 2, a filter cigarette Z' of unit length may be entirely satisfactory in that it comprises a filler (consisting in part of shredded tobacco and in part of filter material) which is of requisite density and whereby the filter is wrapped in an intact tubular body of cigarette paper or analogous wrapping material which is free of leaks and is open at both axial ends. If a satisfactory cigarette Z' is tested by resorting to a stream of air which is introduced at 22 and issues at 24, measurements of the stream issuing at 24 will indicate that the pressure of the stream does not deviate appreciably from an optimum value.

The filter cigarette Z' of FIG. 3 has a leak, as shown at 26. This leak is present in the tubular wrapper 28 along a portion of the seam where the edge portions of the wrapper overlie each other. If such a cigarette is tested by an air stream which enters at 22 and leaves at 24, the stream issuing at 24 is weaker than permissible because some air will escape through the leak 26. This cigarette must be detected by the testing apparatus so that it will be ejected or otherwise disposed of before it can reach the storing, packing or other processing station.

The filter cigarette Z' of FIG. 4 comprises a rod-shaped filler 27 which is too loose, i.e., the density of the filler is too low so that it offers too little resistance to the flow of an air stream which enters at 22 and issues at 24. Consequently, the air stream issuing at 24 is too strong and this must be detected by the testing apparatus to make sure that the cigarette is ejected before it can reach the packing station.

FIG. 5 illustrates a filter cigarette Z' which exhibits two defects, namely, a leak 32 in the wrapper and a filler 30 which is too loose. If such a cigarette is tested by a stream of air which is admitted at 22 and issues at 24, it can happen that the result of measurement will suggest a satisfactory cigarette because escape of some air through the leak 32 will be compensated for by less than satisfactory density of the filler 30. In the absence of the leak 32, the measurement of the strength of the air stream issuing at 24 would indicate that the cigarette is unsatisfactory. The same would be true if the filler 30 were too dense. The important advantage of my improved method and apparatus wherein the cigarettes are tested in two ways will be readily understood with reference to this FIG. 5 which shows that one defect may interfere with a test in a way to prevent detection of another defect, or vice versa.

In the testing unit of FIGS. 6 and 7, filter cigarettes Z of double unit length are tested in a manner as disclosed in the aforementioned copending application Ser. No. 208,189 of Kaeding et al. The testing drum 36 corresponds to the testing drum 8 of FIG. 1 and travels past a testing unit which includes two end sealing members 38 and 40. The sealing members 38, 40 are reciprocable in the axial direction of the testing drum 36 as indicated by double-headed arrows 44, 42. The sealing member 38 is formed with a bore 46 which is connected with a conduit 52 leading to a device 50 which may constitute a suction generator or an air compressor. The other sealing member 40 is formed with a bore 48 which can convey the air stream to or from a conduit 56 leading to a signal or impulse generator 54.

The cigarette Z shown in FIGS. 6 and 7 rests on a holder 12 in the pocket 10 of the testing drum 36 and is retained by suction which prevails in the duct 13. The testing operation may be carried out by using compressed air or suction air. The evaluation of the air stream which issues from the cigarette Z at 48 is made by the signal generator 54 which may be of the type as disclosed in the copending application Ser. No. 431,355 of Esenwein assigned to the same assignee. The signal generator 54 is connected with an ampifier 60 by conductor means 58, and the amplifier 60 can send properly amplified signals to the ejecting device 300 which ejects defective cigarettes from the holders 12 before such defective cigarettes reach the transfer station between the testing drum 36 and the next-following conveyor (e.g., the transfer drum 18 of FIG. 1).

Referring now to FIG. 8, there is shown a different testing unit which admits or draws streams of testing air at each axial end of a filter cigarette Z of double unit length. For this purpose, the conduits 52, 56 are connected to each other by a connecting or bridge conduit 62 so that a stream of air issuing from the source 50 (assumed to be an air compressor) is subdivided into a first stream which enters the bore 46 of the end sealing member 38 and a second stream which enters the conduit 62. The second stream is subdivided into a third stream 49 which enters the bore 48 of the end sealing member 40 and a fourth stream which flows into the conduit 56 and to the signal generator 54. The air streams which enter the cigarette Z from the opposite axial ends of the filler tend to expand the wrapper and, if the wrapper has a leak, the pressure of air in the conduit 56 drops so that the signal generator 54 can send an appropriate impulse through the conductor means 58 and on to the amplifier 60.

The testing unit of FIG. 9 is similar to the one of FIG. 8 with the exception that the end sealing member 40 is replaced by an end sealing member 64 which is not provided with a bore 48, i.e., this member 64 simply seals the corresponding end of the wrapper on a filter cigarette Z. The cigarette receives a stream of air through the bore 46 of the end sealing member 38 whereby such air stream tends to expand the wrapper and its pressure drops if the wrapper has a leak. The conduit 52 communicates with a branch conduit 68 leading to a signal generator 66 which is connected with an amplifier 72 by conductor means 70. When the wrapper has a leak, the pressure of air in the conduit 68 drops and the generator 66 sends an impulse which is amplified at 72 and brings about ejection of the corresponding cigarette Z from the testing drum.

As shown in FIGS. 10 and 11, a testing apparatus may include two testing units having the same components as in FIG. 1. At the testing station P2, the sealing drum 14 cooperates with the testing drum 8 in such a way that each pocket 16 defines with the corresponding pocket 10 an elongated cylindrical chamber 74 which accommodates a cigarette Z. The chamber 74 is actually defined by trough-shaped liners 76, 78 which are installed in the pockets 16, 10 and preferably consist of elastic material to insure that the chamber 74 is completely sealed while such pockets travel along the second testing station P2. The liners together form a jacket which surrounds the chamber 74. The duct 15 admits to the chamber 74 a stream 75 of compressed air which is conveyed by a conduit 80 connected to the source 50. The bore 46 of the end sealing member 38 is connected with the conduit 52 which also leads to the source 50. It will be noted that portions of the sealing members 38, 40 are actually engaged by liners 76, 78 at the time the corresponding pockets 10, 16 travel past the testing station P2 to insure that the chamber 74 is properly sealed from the surrounding atmosphere. The bore 46 will admit a stream of air which flows axially through the filler of the cigarette Z while the wrapper of the same cigarette is subjected to the action of air which was admitted through the bore 15. The pressure of the air streams admitted through the conduits 52 and 80 is the same so that the filler can be tested for density regardless of the presence or absence of leaks in the wrapper. In other words, if the wrapper has a leak, air which is admitted through the bore 46 cannot escape through the leak so that the pressure of the air stream issuing from the bore 48 of the end sealing member 40 will indicate the density of the filler and such air stream will cause the signal generator 54 to produce an impulse which will cause ejection of a cigarette having a loose or overly dense filler. It will be seen that the apparatus of FIGS. 9 and 10 can test cigarettes with two types of defects in such a way that one defect cannot prevent detection of the other defect. If the test carried out in the apparatus of FIGS. 10 and 11 indicates that the density of the filler is satisfactory, the cigarette will be advanced to the next testing station where it is tested solely for the presence or absence of leaks in the wrapper. This can be achieved by disconnecting the source 50 from the duct 15 so that some air which is admitted through the bore 46 will be free to escape into the chamber 74 and the signal generator 54 will produce an impulse provided, of course, that the wrapper of the thus tested cigarette actually has one or more leaks. Such testing of wrappers for the presence or absence of leaks may be carried out prior to or after testing of fillers for density. If the wrapper is satisfactory, the cigarette Z has successfully passed both tests and may be delivered to storage or to a packing station. Assuming that the two tests are carried out in succession, i.e., that pressure prevailing in the chamber 74 is reduced after the apparatus has completed the testing of the filler for density, the pressure of air stream which issues at 48 will remain unchanged if the wrapper is not defective so that the signal generator 54 does not produce an impulse.

Referring to FIGS. 12 and 13, there is illustrated a testing apparatus wherein the sealing drum 14 of FIG. 1 or 10 is replaced by pairs of sealing jaws 92, 94 mounted on a testing drum 93. The jaws are movable toward and away from each other by means of suitable motion transmitting rollers 102, 104 and their inner sides are coated with liners 96, 98 of rubber or other suitable elastomeric material which can form an airtight jacket around the wrapper of a cigarette Z. As shown in FIG. 13, the jaws 92, 94 are articulately mounted on the drum 93 and their liners 96, 98 can form with the holder 12 a complete annulus around the wrapper to insure that air admitted through the bore 46 of the end sealing member 38 cannot escape radially through a leaky wrapper but is compelled to flow into the bore 48 of the end sealing member 40. The construction and operation of the signal generator 54 and amplifier 60 are the same as described in connection with FIGS. 6 and 7. When the testing of a filler is completed, the rollers 102, 104 cause or allow the jaws 92, 94 to move away from each other and to thus enable at least some air entering through the bore 46 to escape through the leak or leaks of the wrapper which is held in the holder 95 of the testing drum 93. Consequently, the pressure of air issuing at 48 drops and the signal generator 54 produces an impulse which initiates ejection of a defective cigarette.

The jaws 92, 94 may be biased by suitable springs which tend to maintain them in open position so that the rollers 102, 104 must overcome the bias of such springs when the jaws are to move the positions shown in FIG. 12. A similar system of sealing jaws is disclosed in German utility model No. 1,912,849. Reference may be had to the publication entitled "Beitraege zum Stand der Technik in der tabakverarbeitenden Industries," 3rd year, No. 2, page 213, published by Hans Pape, Ohlsdorfer Strasse 29, Hamburg 39, Germany.

The apparatus of FIGS. 12 and 13 is analogous to the apparatus of FIGS. 10 and 11 with the exception that the pneumatic sealing action (FIGS. 10 and 11) is replaced by a mechanical sealing action. When the jaws 92, 94 are moved to sealing position, the filler can be tested for density regardless of the presence or absence of leaks. The testing of wrappers for leaks can be carried out immediately after completion of testing of fillers for density. The liners 96, 98 come into actual contact with the wrapper along the full length thereof so that the chamber defined by these liners is completely filled when the jaws 92, 94 are moved to the positons shown in FIG. 12.

FIGS. 14 and 15 illustrate a modified testing unit which examines the cigarettes Z with a view to determine the density of their fillers and wherein such testing operation is carried out without resorting to air streams. The testing unit comprises a plurality of scanning arms 112 each of which is mounted at the free end of a leaf spring 114. The arms 112 form a row which extends lengthwise of a tested cigarette Z and the springs 114 bias the respective arms against the wrapper of the cigarette so that an arm which happens to overlie a relatively soft portion of the filler penetrates deeper toward the axis of the testing drum 124. The arms 112 are provided with registering channels or grooves 116 which are located between a source 120 of light and a signal generator 128, for example, a photoelectric cell which is connected with an amplifier 134 serving to effect ejection of unsatisfactory cigarettes. The components 120, 128 are respectively mounted on two fixed frame members or walls 118, 126 and the source 120 may constitute a suitable lamp which is connected with a source of electrical energy by means of conductors 122. Conductors 130 connect the cell 128 with the amplifier 134.

When at least one of the arms 112 detects a soft spot in the filler of the cigarette Z, it moves out of registry with the remaining arms 112 and into abutment with a stop 136. When an arm 112 abuts against the stop 136, its groove 116 is out of registry with the remaining grooves so that the beam of light passing from the source 120 to the cell 128 is interrupted and the cell causes the amplifier to eject such cigarette at the time the latter reaches the ejecting station. The sensitivity of the unit shown in FIGS. 14 and 15 depends on the number of arms 112 and on the positioning of the stop 136. Thus, if the number of arms 112 is increased, each such arm will scan a relatively small portion of the filler so that the unit will detect relatively short or highly localized soft or overly dense spots in the filler. The position of the stop 136 and/or the dimensioning of grooves 116 will determine the range within which the density of fillers can vary without causing ejection of cigarettes.

It is obvious that the unit of FIGS. 14 and 15 can also detect fillers which are too dense (i.e., too hard) because, by meeting a dense portion of the filler, the corresponding arm 112 will fail to penetrate into the cigarette (or, better to say, it will fail to deform the wrapper) to the same extent as the remaining arms 112 whereby its groove 116 again moves out of alignment with the remaining grooves and the light beam passing from the source 120 to the cell 128 is interrupted to cause the generation of an appropriate signal.

FIG. 16 shows the circuit of a further testing apparatus. This apparatus comprises two separate signal generators (not shown) each of which is connected with one of the amplifiers 138, 140. The two amplifiers transmit signals to a common servo unit 142 which can operate or effect operation of a suitable pneumatic or mechanical ejecting device 400. The connection between the amplifiers 138, 140 and the servo unit 142 is such that the latter will cause ejection of a cigarette if it receives impulse from a single amplifier or from both amplifiers. The two amplifiers 138, 140 may send signals simultaneously or one after the other. If only one of the amplifiers is to transmit a signal, such transmission takes place through conductor means 144 or 146, i.e., directly from the amplifier 138 or 140 to the servo unit 142. Additional conductor means 148, 150 respectively connect the amplifiers 138, 140 with an input line 156 for the servo unit 142, and each of the conductor means 148, 150 includes a rectifier 152.

The testing apparatus of FIG. 17 constitutes a modification of the apparatus which is shown in FIGS. 10 and 11. Each pocket 10 of the testing drum 8 accommodates a holder 12 which can support a cigarette Z. The longitudinal ends of the holder 12 can be engaged by end sealing members 38, 40 having bores 46, 48 which are respectively connected with conduits 52, 56. The conduit 52 is connected to a source 50 of compressed air and the conduit 56 is connected to a signal generator 54 which is turn controls an amplifier 164. A second signal generator 162 is installed in a conduit 160 which connects the duct 15 of the sealing drum 14 with the amplifier 164. Thus, the amplifier 164 can receive impulses from the signal generator 54 and/or 162. The pockets 10, 16 accommodate sealing liners 78, 76 in the same way as shown in FIG. 10 and can define a chamber 74. The liners 76, 78 engage the end sealing members 38, 40 when the testing apparatus is ready to test the cigarette Z in the chamber 74 so that the ends of the cigarette wrapper communicate only with the bores 46, 48 and the duct 15 communicates solely with the chamber 74 because the duct 13 is sealed by the wrapper.

The apparatus of FIG. 17 can test the filler and the wrapper in a simultaneous operation. If the density of the filler is satisfactory and if the wrapper is free of leaks, the signal generators 54 and 162 will send no impulse to the amplifier 164. If the filler is too loose or too dense but the wrapper is satisfactory, the generator 54 will produce an impulse and will cause the amplifier 164 to effect ejection of the cigarette. If the wrapper is leaky, pressure prevailing in the chamber 74 will change and the generator 162 will produce an impulse. If the wrapper is leaky and the filler is too dense or too loose, the pressure in the chamber 74 again changes and the generator 162 produces an impulse despite the fact that, insofar as the generator 54 is concerned, the cigarette appears to be satisfactory.

FIGS. 18 to 44 illustrate various types of testing apparatus each of which actually comprises two testing units of the type shown in FIGS. 1, 6–7, 8, 9, 10–11, 12–13, 14–15 or 16. For convenience, the individual testing units are identified by capital letters A to K. Similar or analogous parts of the apparatus shown in FIGS. 18 to 44 are identified by identical reference numerals. Thus, each numeral 200 denotes a device which may be a compressor or a suction pump, depending upon whether the corresponding testing unit operates with compressed air or suction air. Since the two testing units of each apparatus may include a common device 200, the two individual devices 200 shown in the drawings should be considered as constituting a single part. The signal generators are indicated by reference numerals 202 and 204; however, the numeral 204 is shown only in such drawings wherein the signal generator of one testing unit cannot be used in the other testing unit (compare, for example, FIGS. 18 and 20). The numeral 202 or 204 appears twice in the same figure if the impuse generator 202 or 204 is connected to both ends of a cigarette (see, for example, FIG. 23 where the numeral 204 appears twice). The cigarettes are shown at Z, and each such cigarette may be with or without a filter and may be of unit length or multiple unit length. Such sealing members which are arranged to seal the ends of cigarettes Z but are not connected with signal generators (see the end sealing member 64 of FIG. 9) are indicated at 206, and the numerals 208 denote end sealing members which are connected with signal generators. The numerals 210 denote jackets which can form seals around the wrappers of the cigarettes Z in the same way as shown in FIG. 12. Jackets which define a chamber 74 are indicated at 212. As shown, for example, in FIG. 19, the jackets 212 are provided with annular collars 212a which move into sealing engagement with the axial ends of the wrappers.

The testing apparatus of FIG. 18 comprises two testing units A and B. The unit A comprises an end sealing member 208 which corresponds to the end sealing member 38 of FIG. 6 and seals the left-hand end of the wrapper on the cigarette Z. The sealing member 208 is provided with a bore which communicates with the device 200, and the conduit between the sealing member 208 and the device 200 contains a signal generator 202. Similar testing units, but for use in testing of stationary (non-moving) cigarettes, are disclosed for example in British Patent No. 937,426, in Swedish Patent No. 187,056 or in French Patent No. 1,378,387. Reference may also be had to German utility model No. 704,250 of Kurt Körber. The end of the cigarette is introduced into a deformable gripping device which can be applied around the cigarette end in response to pressure generated by compressed air. A second source of air then causes a stream of air to flow through the cigarette and a signal generator is interposed in the conduit between the cigarette end and the second source to measure the resistance which the filler of the cigarette offers to the flow of air.

The testing unit B of FIG. 18 is similar to the unit A but includes an end sealing member 206 which seals the right-hand end of the cigarette Z during testing. Actually, the testing unit B corresponds to the one shown in FIG. 9 wherein the end sealing member 64 corresponds to the end sealing member 206.

As stated before, the device 200 of FIG. 18 may constitute a source of compressed air or a suction generator which draws air through the cigarette. If the device 200 is a suction generator, the unit A will draw a stream of air from the right-hand end toward and through the left-hand end of the cigarette Z. Some air will also enter through the wrapper because even a satisfactory cigarette wrapper is not entirely airtight. Thus, the resistance which the inflowing air stream meets is generated in part by the filler and in part by the wrapper of the cigarette Z. The pressure of the air stream passing through the signal generator 202 will be indicative of the condition of the filler as well as of the condition of the wrapper. When the same cigarette Z is then tested in the unit B, air can enter only through the wrapper because the right-hand end of the wrapper is sealed by the sealing member 206. The pressure of such air stream is determined by the signal generator 204 which sends an appropriate impulse if the wrapper as a leak. The difference between the resistance offered by a satisfactory wrapper and the resistance offered by a leaky wrapper is so great that the signal generator 204 can readily detect such difference and produces a signal which is then transmitted to the ejector.

If the device 200 is a compressor, the operation of the testing units A and B will be analogous, i.e., only the direction of air flow is reversed without, however, affecting the results of tests.

The testing apparatus of FIG. 18 may include a drum or a similar conveyor whereon the cigarettes preferably advance sideways, For testing with the unit A, the end sealing member 206 is held away from the cigarette Z. The two signal generators 202, 204 may be combined into a composite device. Two generators are necessary because the range of pressures measured by the unit A is different from the range of pressures measured by the unit B. In other words, the sensitivity of the signal generator 204 is not or need not be the same as that of the signal generator 202.

A composite signal generating device which responds to two different pressure ranges is disclosed, for example, in the aforementioned copending application Ser. No. 431,355 of Esenwein. Another signal generating device which can respond at two different pressure ranges and which may be modified for use as a substitute for the signal generators 202, 204 of FIG. 18 is disclosed in the copending application Ser. No. 214,460 of Kaeding et al. which is assigned to the same assignee. The Esenwein application discloses a device with two diaphragms each of which responds to a different pressure. The Kaeding et al. application discloses a floating member whose position is determined by the strength of an air stream in which the floating member is suspended. A photoelectric cell scans the floating member and sends a signal when the floating member leaves its optimum (predetermined) position. By installing in the Kaeding device a second photoelectric cell which responds to a different displacement of the floating member, such modified device can be used as a substitute for the signal generators 202, 204 of FIG. 18.

In the apparatus of FIG. 19, the testing unit A is combined with a testing unit C including a device 200 and an end sealing member 208 corresponding, for example, to the end sealing member 38 of FIG. 6. The wrapper of the cigarette Z in the testing unit C is surrounded by a jacket 212 having annular flanges 212a which can engage the adjoining longitudinal ends of the wrapper. The chamber defined by the wrapper and the jacket 212 is connected with a duct corresponding to the duct 15 of FIG. 7 and leading to a signal generator 204. The stream of air passes axially through the cigarette Z independently of whether the numeral 200 denotes a compressor or a suction generating device. If the wrapper is satisfactory, the generator 204 will not produce an impulse because a satisfactory wrapper allows only a very weak air stream to penetrate through its pores, and such a weak air stream cannot cause the generation of an impulse. If the wrapper has a leak, the strength of the air stream flowing through the chamber surrounded by the jacket 212 is sufficient to initiate the generation of an ejection impulse. If the device 200 in the testing unit C sucks air through the cigarette Z and the wrapper of this cigarette has a leak, the air will flow from the chamber, through the leak, and into the interior of the cigarette. On the other hand, if the device 200 in the unit C consititutes a compressor, air will penetrate from the filler, through the leak, and into the chamber defined by the jacket 212 so that the rise in air pressure is detected by the signal generator 204 which again produces an impulse resulting in ejection of the cigarette.

FIG. 20 shows a testing apparatus wherein the testing unit A is combined with a testing unit D. The unit D is nearly identical with the unit A but further comprises a sealing jacket 210 which prevents penetration of air through the wrapper regardless of whether or not the wrapper has a leak. Thus, the jacket 210 may be the same as the one shown in FIG. 12. The air stream flows axially through the filler and the signal generator 202 responds if the pressure of such air stream is outside of a preselected range. In other words, the signal generator 202 compares the actual pressure with a predetermined optimum pressure and responds if the difference between the actual pressure and optimum pressure exceeds a given value. It will be seen that the unit D tests only the filler of a cigarette and that this unit can detect excessive as well as unsatisfactory density of the filler. The apparatus of FIG. 20 may be identical or similar to the one shown in FIG. 1. The unit A is installed at the station P1 and the unit D is installed at the station P2. The two stations (and hence the units A, D) may be located immediately adjacent to each other and may utilize the same signal generator 202. In testing at the station P1, the jacket 210 is moved to its idle or unsealing position so that the device 200 may draw or send an air stream through the filler as well as through the pores of the wrapper. At the time the cigarette arrives at the second station P2, the jacket 210 is moved to sealing position so that the device 200 draws or sends a stream of air which can pass through the filler but not through the wrapper. In other words, the unit A will test the filler and the wrapper whereas the unit D will test only the filler. An important advantage of this testing apparatus is that it utilizes a single signal generator 202, and this is possible because the difference between the pressure of an air stream which can flow through a satisfactory filler and through a satisfactory wrapper, and the pressure of an air stream which can flow only through a satisfactory filler is minimal and invariably remains within the permissible range. As stated before, the device 200 for the units A and D of FIG. 20 can constitute a compressor or a suction pump.

In FIG. 21, there is shown a testing apparatus which comprises the testing unit A and a testing unit E. The unit E includes all components of the unit D and an end sealing member 208. The signal generator 202 is connected with a conduit which passes through the right-hand end sealing member 208, namely, that sealing member which is located opposite the one connected with the device 200. The operation of the unit E is analogous to that of the unit D, i.e., the unit E will detect excessive or insufficient density of a filler because the jacket 210 forms a seal around the wrapper and air admitted or drawn by the device 200 at one end must pass through the other end to initiate the generation of an impulse if the drop in pressure is excessive or too small. The unit E may be the same as the one shown in FIGS. 12 and 13.

Another suitable testing unit which may serve as the unit E is disclosed in German utility model No. 1,912,849.

FIG. 22 illustrates a testing apparatus wherein the unit A is combined with a further testing unit F which includes a jacket 212 connected with a device 200 by a conduit which passes through a signal generator 204. The latter responds when the pressure in the chamber defined by the jacket 212 exceeds or is less than a permissible pressure, i.e., when the wrapper of the cigarette Z is leaky. The device 200 sends or draws a stream of air which enters the chamber defined by the jacket 212 and penetrates through the leak or leaks of a defective wrapper so that the pressure in the chamber decreases or increases and the generator 204 sends an impulse which causes ejection of the cigarette. The unit F will be able to detect very small leaks in the wrapper if the volume of the chamber defined by the jacket 212 is relatively small. If the device 200 in the unit F constitutes a suction pump, the signal generator 204 will respond when the suction in the chamber decreases due to entry of air through a leaky wrapper.

In FIG. 23, the apparatus comprises a testing unit A and a testing unit G which latter is similar to the unit F with the exception that it further includes two end sealing members 208 and that the signal generator is not installed in the conduit between the device 200 and the chamber defined by the jacket 212. Each end sealing member 208 is combined with a signal generator 204. A similar testing unit is disclosed in French Patent No. 1,371,259 wherein the signal generators consist of diaphragms disposed at the axial ends of the cigarettes and being flexed in response to changes in air pressure. Each diaphragm constitutes one electrode of a capacitor so that the capacitance of the capacitor changes in response to flexing of the respective electrode.

Alternatively, the testing unit G may be constructed in a manner substantially as disclosed in the aforementioned application of Esenwein or Kaeding et al. (Ser. No. 214,460). The unit G tests merely the wrapper and the apparatus of FIG. 23 must include at least two signal generators.

FIG. 24 shows a testing apparatus which is very similar to the one shown in FIG. 23. The unit G is replaced by a testing unit H wherein one of the signal generators 204 is omitted and one of the end sealing members 208 is replaced by a non-apertured end sealing member 206. This unit H again tests only the integrity of wrappers.

Referring now to FIG. 25, there is illustrated a testing apparatus which comprises a testing unit B and a testing unit K. The unit K differs from the unit A in that it comprises two end sealing members 208 and in that the signal generator 202 is located at the right-hand end of the cigarette Z. The unit K corresponds to the unit which is shown in FIG. 7, as well as to the units which are disclosed in the applications Ser. Nos. 208,189 and 214,460 of Kaeding et al.

If the device 200 of the unit K sends a stream of compressed air, the signal generator 202 measures the pressure of the air stream which issues at the right-hand end of the cigarette Z. If the wrapper has a leak, the air stream issuing from the axial end of the wrapper will be weaker and the signal generator 202 detects this and produces an appropriate impulse. If the device 200 in the unit K constitutes a suction generator, the air stream which issues at the left-hand end of a satisfactory wrapper will be just as strong or of substantially the same strength as the air stream which passes through the generator 202 and thereupon enters the right-hand end of the wrapper. The pressure of the air stream varies in dependency on the density of the filler, regardless of whether the air stream is generated by suction or issues from a source of compressed air.

The effect of the testing apparatus which is shown in FIG. 25 is substantially the same as that of the apparatus shown in FIG. 18. The unit A or K tests the wrapper and the filler. The difference is in the positioning of the signal generator 202.

The testing apparatus of FIGS. 26, 27, 28, 29, 30 and 31 are respectively analogous to the apparatus of FIGS. 19, 20, 21, 22, 23 and 24. The apparatus of FIG. 28 has been found to be particularly advantageous because the two testing units E and K may be assembled into a very compact structure. The sole difference between the units E and K is that the former includes the jacket 210. In other words, the apparatus of FIG. 28 requires a single generator 202, two end sealing members 208, a single device 200 (either a compressor or a suction pump) and the jacket 210. During testing in the unit K, the jacket 210 is open so that the signal generator 202 responds if the wrapper has a leak and/or if the filler is too loose or too dense. The testing unit E tests only the filler because the wrapper is then bodily surrounded by the jacket 210 along the full length of the cigarette Z. The apparatus of FIG. 28 is similar to the aparatus of FIG. 1, i.e., the sole difference resides in that the pockets 10, 16 of the drums 8, 14 should form a jacket which is similar to the jacket shown in FIG. 12. The testing stations P1 and P2 may be placed very close to each other and respectively accommodate the units K and E of FIG. 28. The distance between the stations P1 and P2 may be so small that the device 200 sends or draws a single air stream which is measured by the signal generator 202 at the station P1 to determine the presence of leaks and/or the density of the filler, and which is still measured by the signal generator 202 at the station P2 where the jacket 210 is closed so that the unit E tests solely the filler but not the wrapper. It will be noted that, while one can speak of two testing units E and K, these testing units may have identical and even common parts whereby the application or utilization of one or more non-common parts (210) will cause the corresponding unit to carry out a test which is different from and is not affected by the test carried out by the other unit.

The apparatus of FIG. 31 resembles even more closely the apparatus of FIG. 1 because the jacket 212 of the testing unit H defines a chamber which is connected with the device 200. In this apparatus, the testing stations P1 and P2 should be more distant from each other because the units K and H cannot examine the same air stream.

In each of the testing apparatus which are shown in FIGS. 18 to 31, the first testing unit (A or K) examines the density of the filler and the integrity of the wrapper. In the testing apparatus of FIG. 32, the first testing unit D examines only the density of the filler and the second testing unit B examines only the integrity of the wrapper. In other words, each of the units D and and B can examine only one component of the cigarette Z. It is immaterial whether the unit D is installed upstream of the unit B, or vice versa. Each of the units D and B shown in FIG. 32 introduces a stream of air at one end of the wrapper and the air stream is tested before it enters or after it issues from the cigarette, depending upon whether the device 200 is a compressor or a suction fan. The unit D utilizes a jacket 210 so that it tests only the filler. The unit B utilizes an end sealing member 206 which seals one end of the wrapper so that the signal generator produces an impulse if the wrapper has a leak. In the unit D, air can escape or enter only at the right-hand end of the filler, whereas the unit B tests in such a way that air can escape or enter only through the wrapper. Since the resistance met by the air stream which is examined by the unit D is substantially different from the resistance met by the stream which is examined by the unit B, the two units respectively comprise differently calibrated signal generators 202, 204. Alternatively, a throttle must be installed between the device 200 and the signal generator 204 of the unit B to insure that this same signal generator 204 may be used in the unit D.

Figure 33:
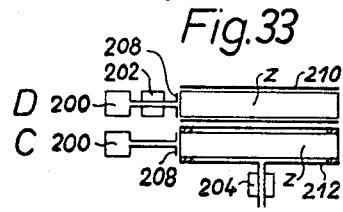
Figure 42:
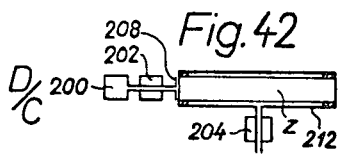

In the testing apparatus of FIG. 33, the testing unit D is combined with the testing unit C. Both testing operations can be carried out simultaneously if the two units are mounted in a manner as shown in FIG. 42. In the apparatus of FIG. 42, the signal generator 202 will detect defects in the wrapper because some air will penetrate into the chamber which is defined by the jacket 212. If the signal generator 202 is to examine only the filler, the units D and C must be installed in a manner as shown in FIG. 33.

Figure 34:
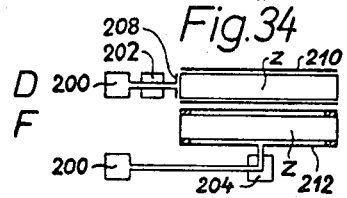
Figure 35:
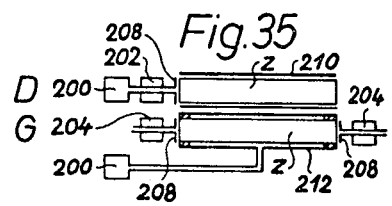
Figure 36:
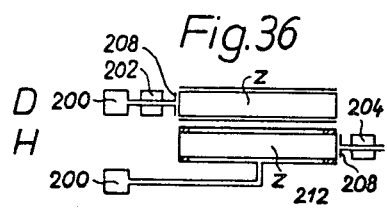

FIGS. 34, 35 and 36 respectively illustrate testing apparatus which comprise the units D-F, D-G and D-H. In each of these apparatus, the cooperating testing units must be installed separately. The units D and F, D and G, D and H of FIGS. 34, 35 and 36 respectively examine only one component of the cigarette Z at a time, i.e., the unit D examines the filler and the unit F, G or H examines the wrapper.

Figure 37:
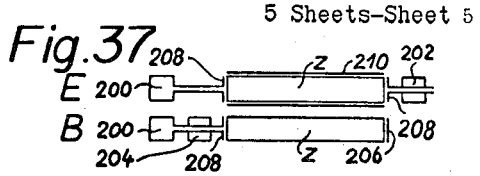
Figure 38:
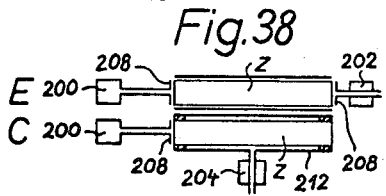
Figure 39:
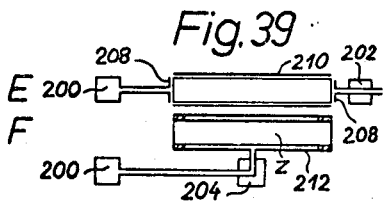
Figure 40:
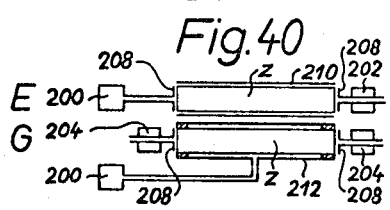
Figure 41:
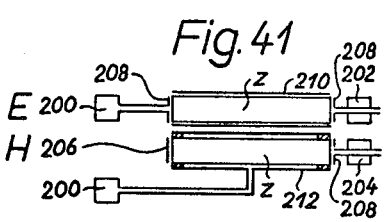
Figure 44:
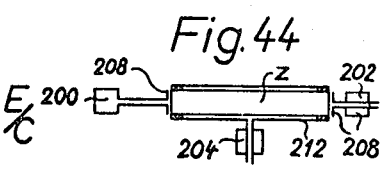

The apparatus of FIG. 37 comprises the testing units E and B. This apparatus is similar to the one shown in FIG. 32 because the unit E tests only the filler, i.e., the same as the unit D of FIG. 32. The apparatus of FIGS. 38, 39, 40 and 41 are respectively analogous to the apparatus of FIGS. 33, 34, 35 and 36. FIG. 44 shows that the testing units E, C of FIG. 38 may be combined to carry out their testing operations in a simultaneous step. However, the signal produced by the generator 202 of FIG. 44 will be influenced by the condition of the wrapper because some air will flow through the wrapper and into the annular chamber defined by the jacket 212.

Referring again to FIG. 43, there is shown a testing apparatus which comprises a combination of testing units A and K. A feature of this apparatus is that each of the two units examines both components of the cigarette Z, i.e., the wrapper and the filler. In other words, not only the signal generator 202 but also the signal generator 204 will send impulses if the wrapper and/or the filler fails to meet the test for integrity.

The two signal generators 202, 204 are disposed at the opposite ends of the cigarette Z. If the device 200 constitutes a compressor, the stream of testing air is introduced at the left-hand end of the wrapper and issues from the right-hand end. The pressure of the air stream depends in part upon the resistance offered by the filler and in part upon the condition of the wrapper. If the wrapper is satisfactory, it allows only a very small percentage of air to pass therethrough (the wrapper is slightly porous) so that the test value determined by the signal generator 202 is substantially the same as that determined by the signal generator 204. The apparatus invariably detects a leak or a filler of unsatisfactory density for the following reasons: If the wrapper has a leak but the filler is satisfactory, such defect will be detected by the signal generator 204. If the wrapper is satisfactory but the filler is too loose or too dense, such defect is detected by both signal generators. If the wrapper is leaky and the filler is too dense to such an extent that escape of air through the leaky wrapper is offset by greater density of the filler, the signal generator 204 will not produce a signal but the signal generator 202 will.

Figure 43:
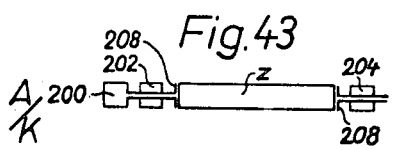

If the device 200 in FIG. 43 constitutes a vacuum pump, the direction of air flow is reversed but the operation is analogous. Such apparatus is similar to the one disclosed in the application Ser. No. 208,189 of Kaeding et al. All that is needed is to provide the apparatus of Kaeding with a second signal generator which is located at the intake end of the cigarette.

In FIGS. 18 to 44, the characters A and K denote units which can test the filler and the wrapper; the characters D and E denote units which can test only the filler; and the characters B, C, F, G and H denote units which can test only the wrapper.

It will be seen that the apparatus shown in FIGS. 18 to 44 can be classified as follows:

(a) Apparatus wherein the one of the testing steps includes testing the filler and the wrapper by conveying through the article a stream of air which flows axially through the filler, and wherein the other testing step includes conveying a stream of air radially of the wrapper (see, for example, FIG. 18).

(b) Apparatus wherein the filler is tested by a stream of axially flowing air while the wrapper is sealed, and wherein the filler and wrapper are tested by terminating the sealing action upon the wrapper (FIG. 20). In such apparatus, the wrapper may be sealed mechanically (FIG. 20 or 21) or by a body of air (FIG. 22) which fills a chamber wherein the article is received.

(c) Apparatus wherein the one of the testing steps includes testing only the filler and the other testing step includes testing only the wrapper (FIG. 32).

(d) Apparatus wherein each of the testing steps includes testing the filler and the wrapper whereby the pressure of the air stream is measured prior and subsequent to passage through the article (FIG. 43).

In apparatus of FIGS. 18-44 wherein each testing unit utilizes streams of air, the number of parts can be reduced considerably by using a common air stream generating device 200 and other parts which are needed for proper operation of both testing units. In many apparatus, such as the one shown in FIG. 20, the sole difference between the two testing units resides in that one thereof utilizes one or more sealing jackets 210. Since the jackets must be opened and closed anyway in order to allow for entry and evacuation of cigarettes, the devices for moving such jackets to open and closed position may be the same devices which move the jackets to or from sealing position. Elastic liners 76, 78 or 96, 98 are of advantage because they enable the respective jackets to accommodate differently dimensioned articles, e.g., cigarettes or filter cigarettes having different diameters.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A method of testing cigarettes and similar rod-shaped articles of finite length wherein a first component in the form of a tubular wrapper surrounds a second component in the form of a filler of air-permeable material and wherein defects of one component might interfere with detection of defects of the other component or vice versa, comprising the steps of subjecting said first component to a first testing action which, in response to the presence of a defect, produces a first result unaffected by the eventual defectiveness of said second component, said first testing action comprising determining the permeability of said first component; subjecting said second component to a second testing action which, in response to the presence of a defect, produces a second result unaffected by eventual defectiveness of said first component, said second testing action comprising determining the density of material in said second component; and disposing of the article when at least one of said testing actions results in detection of an unsatisfactory component.

2. A method as set forth in claim 1, wherein each of said testing actions comprises testing the respective components by air.

3. A method as set forth in claim 2, wherein said second testing action comprises conveying an air stream axially through the filler and comparing the pressure of the air stream with a pressure which is indicative of an article having a filler of satisfactory density, said first testing action comprising conveying an air stream radially of the wrapper and comparing the pressure of the air stream with a pressure which is indicative of an article having a wrapper of satisfactory permeability.

4. A method as set forth in claim 2, wherein said second testing action comprises sealing the wrapper against penetration of air therethrough, conveying an air stream axially through the filler, and comparing the pressure of the air stream with a pressure which is indicative of a filler of satisfactory density, said first testing action comprising conveying an air stream axially through the filler and comparing the pressure of the air stream with a pressure which is indicative of an article with components of satisfactory permeability and density.

5. A method as set forth in claim 2, wherein said second testing action comprises subjecting the exterior of the wrapper to the pressure of a body of air, conveying through the filler an air stream whose pressure prior to entry into the filler equals the pressure of said body, and comparing the pressure of the air stream which issues from the filler with a pressure which is indicative of a filler of satisfactory density, said first testing action comprising conveying an air stream through the filler and comparing the pressure of the air stream with a pressure which is indicative of an article with components of satisfactory permeability and density.

6. A method as set forth in claim 2, wherein said second testing action comprises conveying an air stream axially through the filler and comparing the pressure of the air stream prior to entry into said filler with a pressure which is indicative of an article with components of satisfactory permeability and density, said first testing action comprising conveying an air stream through the filler and comparing the pressure of the air stream which issues from the filler with a pressure which is indicative of an article with components of satisfactory permeability and density.

7. A method as set forth in claim 2, wherein each of said testing actions comprises conveying an air stream through at least one of said components and wherein the air stream utilized in carrying out said second testing action is the same air stream which is utilized in carrying out said first testing action.

8. An apparatus for testing cigarettes and similar rod-shaped articles of finite length wherein a first component in the form of an open-ended tubular wrapper surrounds a second component in the form of a filler consisting of air-permeable material and wherein defects of one component might interfere with detection of defects of the other component or vice versa, comprising conveyor means for advancing the articles sideways; a first testing unit including determining means for determining the permeability of said first component of each article irrespective of eventual defectiveness of the respective second component and means for generating a signal in response to detection of a first component of defective permeability; a second testing unit including determining means for determining the density of material in the second component of each article irrespective of eventual defectiveness of the respective first component and means for generating a signal in response to detection of a second component containing material of unsatisfactory density; and ejector means operatively connected with said units for removing from said conveyor means such articles whose testing resulted in the generation of a signal in response to detection of a defect in at least one component thereof.

9. An apparatus as set forth in claim 8, wherein the determining means of at least one of said testing units comprises means for producing an air stream, means for directing the air stream into one end of each consecutive article, the signal generating means of said one testing unit being arranged to compare the pressure of such air streams with a pressure which is indicative of satisfactory articles.

10. An apparatus as set forth in claim 8, wherein the determining means of each of said testing units comprises means for producing an air stream and means for conveying the air stream through at least one component of each article.

11. An apparatus as set forth in claim 8, wherein said second testing unit further comprises means for determining the permeability of the first component of each article.

12. An apparatus as set forth in claim 8, wherein said first testing unit further comprises means for determining the density of the second component of each article.

13. An apparatus as set forth in claim 8, wherein said testing units comprise common parts.

14. An apparatus as set forth in claim 13, wherein one of said testing units further comprises sealing means and means for moving said sealing means into sealing engagement with consecutive articles while the respective components of such articles are being tested by said one unit.

15. An apparatus as set forth in claim 14, wherein said sealing means comprises a jacket arranged to form a seal around the wrappers of consecutive articles.

16. An apparatus as set forth in claim 15, wherein said jacket comprises a liner of elastically deformable sealing material.

17. An apparatus as set forth in claim 8, wherein said second testing unit comprises mechanical determining means and said first testing unit comprises pneumatic determining means.

18. An apparatus as set forth in claim 8, wherein said ejector means comprises a single ejector connected with the signal generating means of both testing units.

References Cited
UNITED STATES PATENTS

| | | | |
|---|---|---|---|
| 2,937,280 | 5/1960 | Gilman | 131—21 X |
| 3,266,295 | 8/1966 | Williamson | 73—38 |
| 3,270,551 | 9/1966 | Schmalz | 73—45.1 |

DAVID SCHONBERG, *Primary Examiner.*

JEFFREY NOLTON, *Assistant Examiner.*